(12) United States Patent
Chang

(10) Patent No.: US 11,846,799 B1
(45) Date of Patent: Dec. 19, 2023

(54) BACKLIGHT MODULE AND ILLUMINATED KEYBOARD

(71) Applicant: Chicony Power Technology Co., Ltd., New Taipei (TW)

(72) Inventor: Cheng Yi Chang, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 18/336,038

(22) Filed: Jun. 16, 2023

(30) Foreign Application Priority Data

Apr. 27, 2023 (TW) ................. 112115739

(51) Int. Cl.
*F21V 8/00* (2006.01)
*G06F 3/02* (2006.01)

(52) U.S. Cl.
CPC ......... *G02B 6/0066* (2013.01); *G02B 6/0088* (2013.01); *G06F 3/0202* (2013.01)

(58) Field of Classification Search
CPC .... G06F 3/0202; G02B 6/0066; G02B 6/0088
See application file for complete search history.

(56) References Cited

U.S. PATENT DOCUMENTS

| | | | |
|---|---|---|---|
| 8,994,701 | B2 | 3/2015 | Kang |
| 11,366,263 | B1 * | 6/2022 | Ho .......................... F21V 11/16 |
| 2017/0371087 | A1 | 12/2017 | You et al. |
| 2022/0319783 | A1 * | 10/2022 | Liu .......................... G06F 3/021 |

FOREIGN PATENT DOCUMENTS

| | | |
|---|---|---|
| CN | 201038024 Y | 3/2008 |
| CN | 202434396 U | 9/2012 |
| CN | 205227035 U | 5/2016 |
| TW | M444554 U | 1/2013 |
| TW | 201329566 A1 | 7/2013 |
| TW | I756738 B | 3/2022 |
| TW | I780860 B | 10/2022 |
| TW | I787084 B | 12/2022 |
| TW | I796737 B | 3/2023 |

\* cited by examiner

*Primary Examiner* — Karabi Guharay
(74) *Attorney, Agent, or Firm* — CKC & Partners Co., LLC

(57) ABSTRACT

A backlight module includes a circuit board, a light-emitting element, and a light guide plate. The light-emitting element is disposed on the circuit board. The light guide plate is located above the circuit board and has adjacent first and second single-key light guide regions. The first single-key light guide region has an accommodating groove accommodating the light-emitting element. The light-emitting surface of the he light-emitting element faces the second single-key light guiding region. The first single-key light guide region has light guide structures extending along the normal direction of the light-emitting surface. The light guide structures include a first group, a second group, and a third group arranged in sequence. The light-emitting surface is opposite to the second group in the normal direction. A spacing of the second group is larger than a spacing of the first group and a spacing of the third group.

16 Claims, 6 Drawing Sheets

BACKLIGHT MODULE AND ILLUMINATED KEYBOARD

CROSS-REFERENCE TO RELATED APPLICATION

This application claims priority to Taiwan Application Serial Number 112115739, filed Apr. 27, 2023, which is herein incorporated by reference.

BACKGROUND

Technical Field

The present disclosure relates to a backlight module and an illuminated keyboard.

Description of Related Art

The appearances of traditional keyboards are usually monotonous and dull, so computer peripheral manufacturers have developed illuminated keyboards with excellent visual effects. The illuminated keyboards have backlight modules.

Although the backlight modules of the traditional keyboards are simple in design, they can no longer meet the needs of consumers in the market for thickness reduction. With the evolution of LED generation, the backlight modules of the existing keyboards use smaller-sized light-emitting elements and light guide plates to achieve thinner thickness. However, such light-emitting elements are generally forward-emitting, and the light needs to travel sideways through the reflective layer to enter the light guide plate, so the light loss during the turning process will reduce the light efficiency of the backlight modules. Moreover, in order to make the brightness of all keys consistent, at least one light-emitting element needs to be disposed directly under each key.

Accordingly, how to provide a backlight module to solve the aforementioned problems becomes an important issue to be solved by those in the industry.

SUMMARY

An aspect of the disclosure is to provide a backlight module and an illuminated keyboard that can efficiently solve the aforementioned problems.

According to an embodiment of the disclosure, a backlight module includes a circuit board, a first light-emitting element, and a light guide plate. The first light-emitting element is disposed on the circuit board and has a first light-emitting surface. The light guide plate is located above the circuit board and has a first single-key light guide region and a second single-key light guide region adjacent to each other. The first single-key light guide region has an accommodating groove accommodating the first light-emitting element. The first light-emitting surface faces the second single-key light guiding region. The first single-key light guide region has a plurality of light guide structures disposed corresponding to the first light-emitting surface. The light guide structures substantially extend along a first normal direction of the first light-emitting surface. The light guide structures include a first group, a second group, and a third group arranged in sequence. The first light-emitting surface is opposite to the second group in the first normal direction. There is a first spacing between adjacent two of the light guide structures of the first group. There is a second spacing between adjacent two of the light guide structures of the second group. There is a third spacing between adjacent two of the light guide structures of the third group. The second spacing is greater than the first spacing and the third spacing.

In an embodiment of the disclosure, the first spacing is substantially equal to the third spacing.

In an embodiment of the disclosure, there is a first distance between the second group and the third group. The first distance is greater than the second spacing.

In an embodiment of the disclosure, the second single-key light guide region has a plurality of light guide structures substantially extend along the first normal direction. The light guide structures of the second single-key light guide region are located on a side of the second single-key light guide region close to the first single-key light guide region.

In an embodiment of the disclosure, the light guide structures of the second single-key light guide region are divided into a fourth group and a fifth group. There is a fourth spacing between adjacent two of the light guide structures of the fourth group. There is a fifth spacing between adjacent two of the light guide structures of the fifth group. The second spacing is larger than the fourth spacing and the fifth spacing.

In an embodiment of the disclosure, the fourth spacing is substantially equal to the fifth spacing.

In an embodiment of the disclosure, there is a second distance between the fourth group and the fifth group. The second distance is greater than at least one of the fourth spacing and the fifth spacing.

In an embodiment of the disclosure, there is a first distance between the second group and the third group. There is a second distance between the fourth group and the fifth group. The first distance is substantially equal to the second distance.

In an embodiment of the disclosure, the backlight module further includes a second light-emitting element. The second light-emitting element is disposed on the circuit board and has a second light-emitting surface. The first normal direction of the first light-emitting surface is opposite to a second normal direction of the second light-emitting surface. The light guide plate further has a third single-key light guide region. The third single-key light guide region has another accommodating groove accommodating the second light-emitting element. The first single-key light guide region is adjacent to the third single-key light guide region in a lateral direction different from the second normal direction.

In an embodiment of the disclosure, the first single-key light guide region and the third single-key light guide region are mirrored in the second normal direction.

In an embodiment of the disclosure, the light guide plate further has a fourth single-key light guide region adjacent to the third single-key light guide region. The second single-key light guide region and the fourth single-key light guide region are mirrored in the second normal direction.

In an embodiment of the disclosure, the circuit board has a white region. The first light-emitting element is disposed on the white region. A bottom edge of the first light-emitting surface is connected to the white region.

In an embodiment of the disclosure, the backlight module further includes a light-shielding sheet. The light-shielding sheet is disposed above the light guide plate and has a light-shielding region, a first light-transmitting region, and a second light-transmitting region. The light-shielding region, the first light-transmitting region, and the second light-transmitting region are located above the accommodating groove, the first single-key light guide region, and the second single-key light guide region.

In an embodiment of the disclosure, the light-shielding region includes a white layer and a black layer. The white layer is located between the accommodating groove and the black layer.

According to an embodiment of the disclosure, an illuminated keyboard includes a backlight module and a keyboard assembly. The backlight module includes a circuit board, a first light-emitting element, and a light guide plate. The first light-emitting element is disposed on the circuit board and has a first light-emitting surface. The light guide plate is located above the circuit board and has a first single-key light guide region and a second single-key light guide region adjacent to each other. The first single-key light guide region has an accommodating groove accommodating the first light-emitting element. The first light-emitting surface faces the second single-key light guiding region. The first single-key light guide region has a plurality of light guide structures disposed corresponding to the first light-emitting surface. The light guide structures substantially extend along a first normal direction of the first light-emitting surface. The light guide structures include a first group, a second group, and a third group arranged in sequence. The first light-emitting surface is opposite to the second group in the first normal direction. There is a first spacing between adjacent two of the light guide structures of the first group. There is a second spacing between adjacent two of the light guide structures of the second group. There is a third spacing between adjacent two of the light guide structures of the third group. The second spacing is greater than the first spacing and the third spacing. The keyboard assembly is disposed above the backlight module.

In an embodiment of the disclosure, the keyboard assembly has a supporting plate. The supporting plate has a through hole corresponding to the accommodating groove.

Accordingly, in the backlight module and the illuminated keyboard of the present disclosure, the light-emitting element is disposed in the first single-key light guide region of the light guide plate, and the light-emitting surface of the light-emitting element faces the second single-key light guide region adjacent to the first single-key light guide region. With the light guide structures of the first single-key light guide region extend along the normal direction of the light-emitting surface, the light emitted by the light-emitting element can travel from the first single-key light guide region to the second single-key light guide region through the gap among the light guide structures. In this way, the first single-key light guide region and the second single-key light guide region adjacent to each other can share the same light-emitting element, so the total number of light-emitting elements used can be reduced, and the manufacturing cost of the backlight module and the illuminated keyboard of the present disclosure can be effectively reduced. By grouping the light guide structures of the first single-key light guide region and the second single-key light guide region and adjusting the spacing of the light guide structures in each group, the light output brightness of the first single-key light guide region and the second single-key light guide region can be relatively uniform and consistent. By disposing the light-emitting element on the white region of the circuit board and making the bottom edge of the light-emitting surface be completely connected to the white region, the overall luminous effect of the backlight module and the illuminated keyboard of the present disclosure can be effectively improved. By disposing the through hole on the supporting plate of the keyboard assembly corresponding to the accommodating groove of the light guide plate for accommodating the light-emitting element, the light-emitting element can further protrude into the through hole of the supporting plate, so the overall thickness of the backlight module and the illuminated keyboard of the present disclosure can be effectively reduced.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
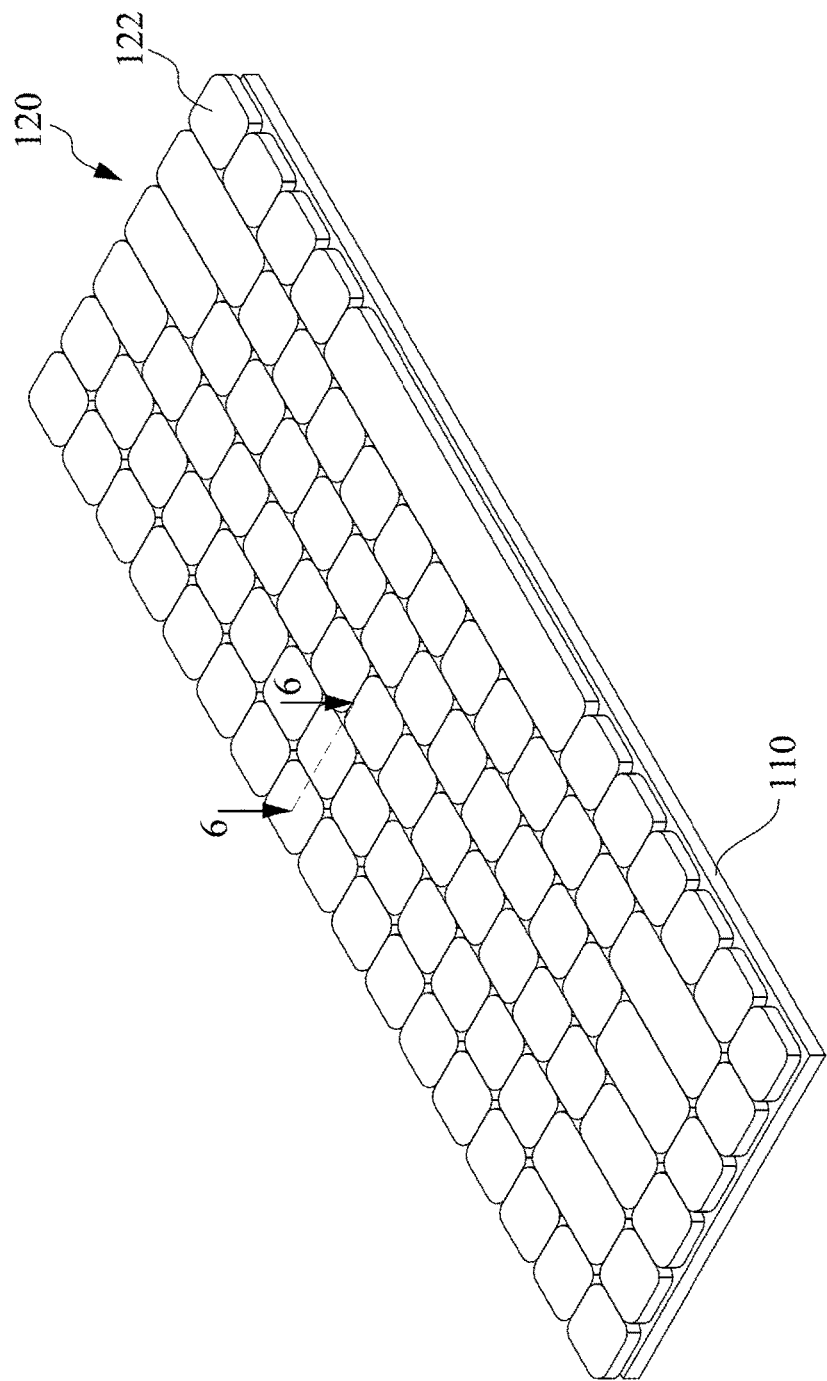
FIG. 1 is a perspective view of an illuminated keyboard according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of an illuminated keyboard 100 according to an embodiment of the disclosure. As shown in FIG. 1, in the present embodiment, the illuminated keyboard 100 includes a backlight module 110 and a keyboard assembly 120. The keyboard assembly 120 is disposed above the backlight module 110 and includes a plurality of key units 122. The key units 122 are configured for the user to press. The backlight module 110 is configured to emit light toward the keyboard assembly 120 so as to make the illuminated keyboard 100 present a luminous effect. In addition, the illuminated keyboard 100 of the present embodiment may be an external keyboard (e.g., a keyboard with a PS/2 interface or a keyboard with a USB interface) used in a desktop computer, or may be an input device in the form of a keyswitch, but the disclosure is not limited in this regard. That is, concepts of the illuminated keyboard 100 of the present disclosure may be used in any electronic product that performs input function by pressing.

Figure 2:
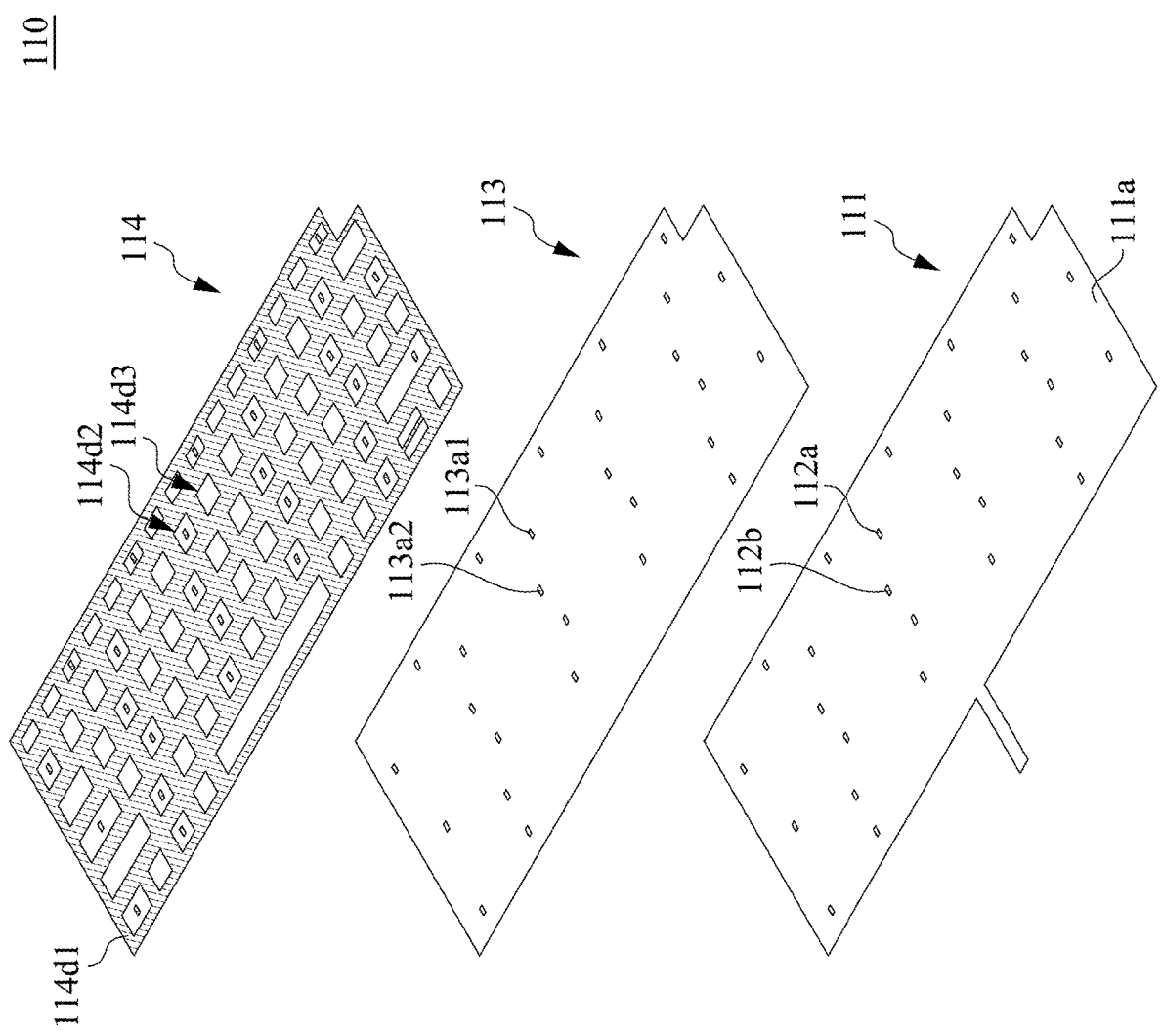
FIG. 2 is an exploded view of a backlight module according to an embodiment of the disclosure.

Reference is made to FIG. 2. FIG. 2 is an exploded view of the backlight module 110 according to an embodiment of the disclosure. As shown in FIG. 2, in the present embodiment, the backlight module 110 includes a circuit board 111, a plurality of light-emitting elements 112a, 112b, a light guide plate 113, and a light-shielding sheet 114. The circuit board 111 has a surface 111a facing the light guide plate 113. The light-emitting elements 112a, 112b are disposed on the surface 111a. The light guide plate 113 is located above the circuit board 111. The light-shielding sheet 114 is disposed above the light guide plate 113. That is, the light guide plate 113 is located between the circuit board 111 and the light-shielding sheet 114. The light guide plate 113 has accommodating grooves 113a1, 113a2 accommodating the light-emitting elements 112a, 112b. The light-emitting elements 112a, 112b are configured to emit light toward the inner walls of the accommodating grooves 113a1, 113a2 respectively, so as to incident the light into the light guide plate 113. The light guide plate 113 includes a plurality of single-key light guide regions respectively located under the key units 122. After the light traveling in the light guide plate 113 reaches the single-key light guide regions, it will be guided by the single-key light guide regions and leave the light guide plate 113. The light leaving the light guide plate 113 will pass through the light-shielding sheet 114 and reach the upper keyboard assembly 120, so that the luminous keyboard 100 presents a luminous effect.

In some embodiments, the light-emitting elements 112a, 112b may be but not limited to light-emitting diodes (LED).

Figure 3:
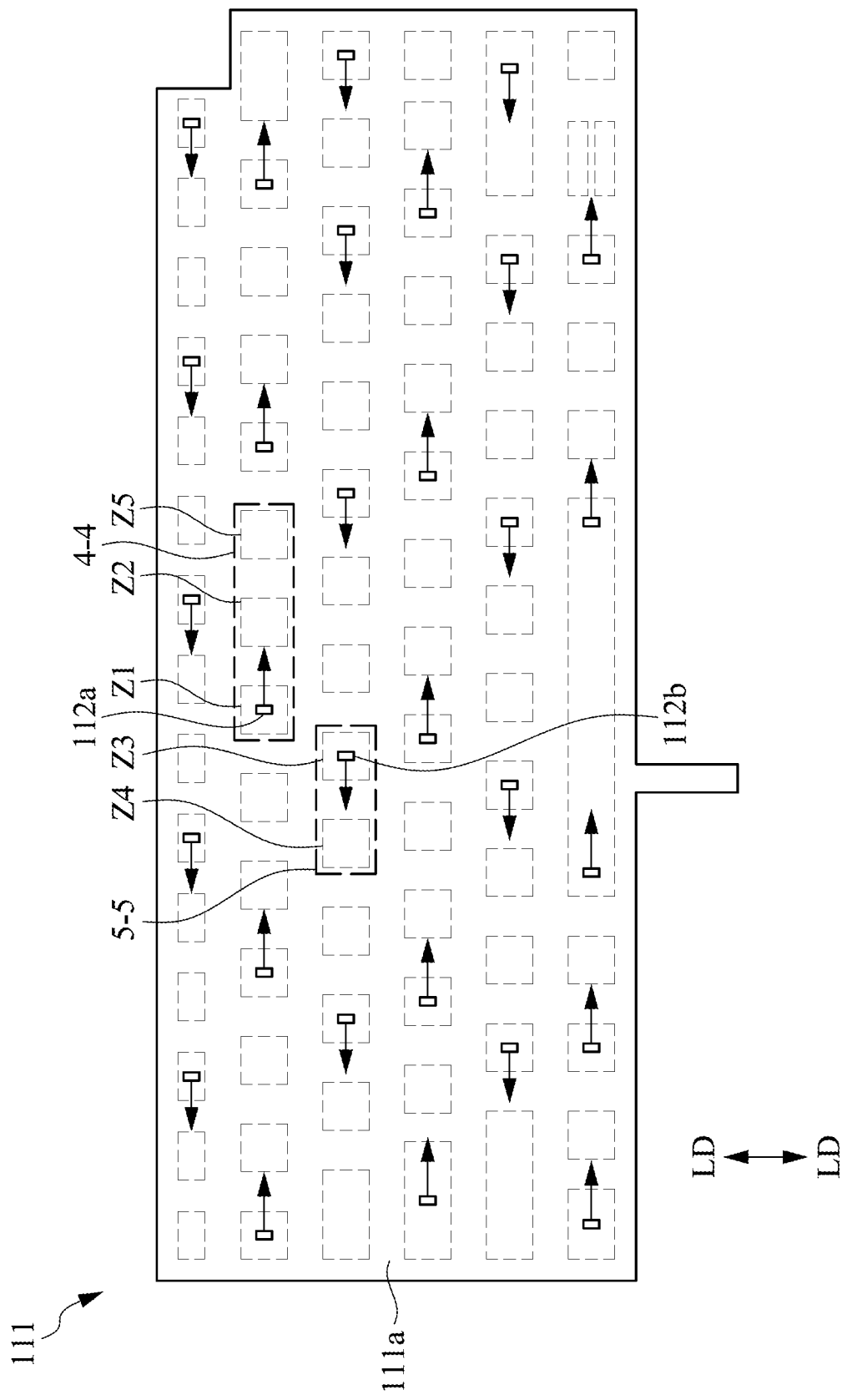
FIG. 3 is a top view of some components of the backlight module in FIG. 2.
Figure 4:
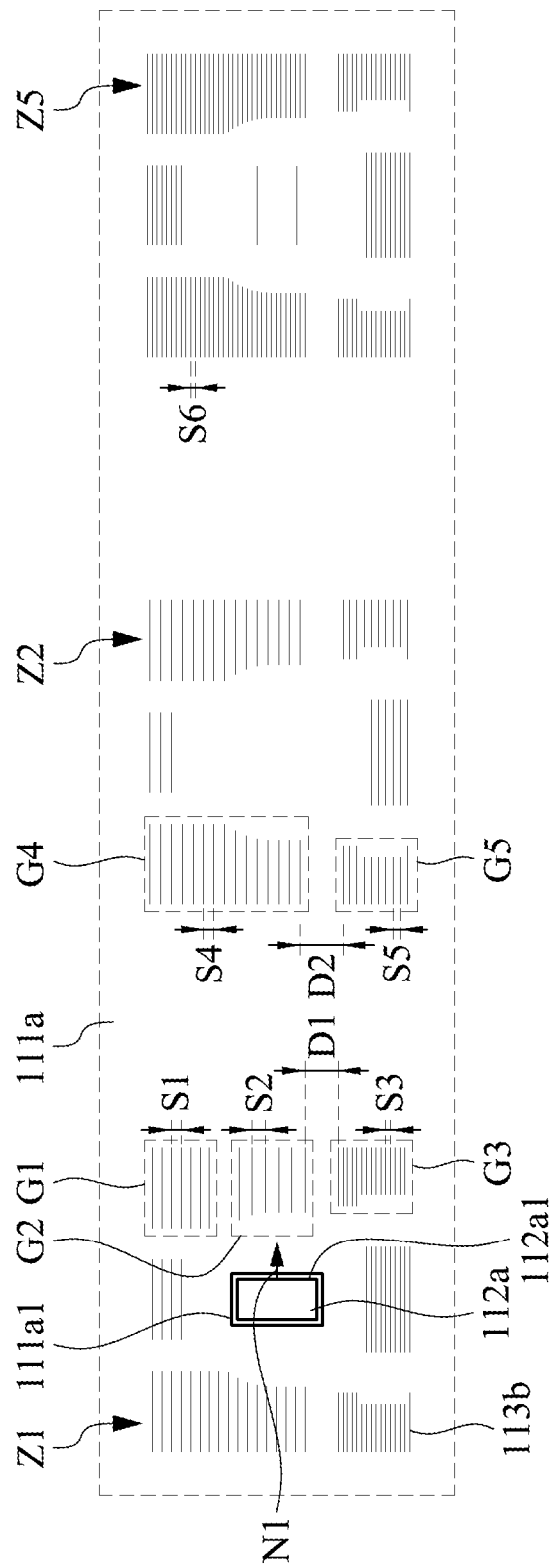
FIG. 4 is a partial enlarged view of a circuit board and a light guide plate in FIG. 2 corresponding to the region 4-4 in FIG. 3.

Reference is made to FIGS. 3 and 4. FIG. 3 is a top view of some components of the backlight module 110 in FIG. 2. FIG. 4 is a partial enlarged view of the circuit board 111 and the light guide plate 113 in FIG. 2 corresponding to the region 4-4 in FIG. 3. Specifically, FIG. 3 mainly shows the top view of the circuit board 111 and the light-emitting elements 112a, 112b disposed thereon, and the single-key light guide regions of the light guide plate 113 is marked with dotted lines. As shown in FIGS. 3 and 4, in the present embodiment, the light-emitting element 112a has a light-emitting surface 112a1. In some embodiments, the light-emitting surface 112a1 is substantially perpendicular to the surface 111a of the circuit board 111, but the present disclosure is not limited thereto. The light guide plate 113 has a first single-key light guide region Z1 and a second single-key light guide region Z2 adjacent to each other. The first single-key light guide region Z1 has the accommodating groove 113a1 accommodating the light-emitting element 112a. The light-emitting surface 112a1 faces the second single-key light guiding region Z2. Specifically, the first single-key light guide region Z1 has a plurality of light guide structures 113b (for example, recessed microstructures or protruding microstructures) located in front of the light-emitting surface 112a1. When the light traveling inside the light guide plate 113 reaches the light guide structures 113b, it will be reflected upward by the light guide structures 113b.

In some embodiments, the light-emitting element 112a is a side-view LED. That is, the amount of light emitted by the light-emitting surface 112a1 of the light-emitting element 112a is greater than that of the other five surfaces.

As shown in FIG. 4, in the present embodiment, the light guide structures 113b substantially extend along a normal direction N1 of the light-emitting surface 112a1. With the light guide structures 113b of the first single-key light guide region Z1 that extend along the normal direction N1 of the light-emitting surface 112a1, the light emitted by the light-emitting element 112a can travel from the first single-key light guide region Z1 to the second single-key light guide region Z2 through the gaps among the light guide structures 113b. In this way, the first single-key light guide region Z1 and the second single-key light guide region Z2 adjacent to each other can share the same light-emitting element 112a (that is, the second single-key light guide region Z2 may not have the accommodating groove 113a1), so the total number of light-emitting elements 112a used can be reduced, and the manufacturing cost of the backlight module 110 and the illuminated keyboard 100 of the present embodiment can be effectively reduced.

As shown in FIG. 4, in the present embodiment, the light guide structures 113b are substantially parallel to the normal direction N1 of the light-emitting surface 112a1, but the present disclosure is not limited thereto. In practical applications, the light guide structures 113b can be other line structures than straight lines. For example, the extending direction of each of the light guide structures 113b can be defined by the connecting direction of its two ends, but the present disclosure is not limited thereto.

In detail, as shown in FIG. 4, in the present embodiment, the light guide structures 113b of the first single-key light guide region Z1 include a first group G1, a second group G2, and a third group G3 arranged in sequence. For example, the first group G1, the second group G2, and the third group G3 are arranged in sequence along a lateral direction LD. The light-emitting surface 112a1 is opposite to the second group G2 in the normal direction N1. There is a first spacing S1 between adjacent two of the light guide structures 113b of the first group G1. There is a second spacing S2 between adjacent two of the light guide structures 113b of the second group G2. There is a third spacing S3 between adjacent two of the light guide structures 113b of the third group G3. The second spacing S2 is greater than the first spacing S1 and the third spacing S3. In other words, the density of the light guide structures 113b of the first group G1 and the third group G3 is greater than the density of the light guide structures 113b of the second group G2.

It should be noted that since the light-emitting surface 112a1 is opposite to the second group G2 in the normal direction N1, it means that the first group G1 and the third group G3 are farther away from the light-emitting surface 112a1 than the second group G2. For example, as shown in FIG. 4, the first group G1 is located at the upper right of the light-emitting surface 112a1, and the third group G3 is located at the lower right of the light-emitting surface 112a1. In other words, the amount of light reaching the second group G2 is greater than the amount of light reaching the first group G1 and the third group G3. By making the first spacing S1 of the light guide structures 113b of the first group G1 and the third spacing S3 of the light guide structures 113b of the third group G3 smaller than the second spacing S2 of the light guide structures 113b of the second group G2, the amount of light reflected upward by the first group G1 and the third group G3 can be increased. In this way, the output brightness of the light reflected upward by the first group G1, the second group G2, and the third group G3 can be made relatively uniform and consistent.

In some embodiments, the lateral direction LD is perpendicular to the normal direction N1 of the light-emitting surface 112a1, but the present disclosure is not limited thereto.

In some embodiments, the first spacing S1 of the first group G1 is substantially equal to the third spacing S3 of the third group G3, but the present disclosure is not limited thereto.

As shown in FIG. 4, in the present embodiment, there is a first distance D1 between the second group G2 and the third group G3. The first distance D1 is greater than the second spacing S2. By having the first distance D1 between the second group G2 and the third group G3, it can be ensured that a part of the light emitted by the light-emitting surface 112a1 reaches the second single-key light guide region Z2 through the gap between the second group G2 and the third group G3 without hindrance. In some embodiments, the interval between the second group G2 and the third group G3 is opposite to one side edge of the light-emitting surface 112a1 in the normal direction N1 (for example, the lower side edge of the light-emitting surface 112a1 in FIG. 4), and is deviated from another side edge of the light-emitting surface 112a1 (for example, the upper side edge of the light-emitting surface 112a1 in FIG. 4).

As shown in FIG. 4, in the present embodiment, the second single-key light guide region Z2 also has a plurality of light guide structures 113b substantially extending along the normal direction N1. The light guide structures 113b of the second single-key light guide region Z2 are the same or similar to the light guide structures 113b of the first single-key light guide region Z1. The light guide structures 113b on the side of the second single-key light guide region Z2 close to the first single-key light guide region Z1 are divided into a fourth group G4 and a fifth group G5. There is a fourth spacing S4 between adjacent two of the light guide structures 113b of the fourth group G4. There is a fifth spacing S5 between adjacent two of the light guide structures 113b of the fifth group G5. The second spacing S2 is larger than the fourth spacing S4 and the fifth spacing S5. In other words, the density of the light guide structures 113b of the fourth group G4 and the fifth group G5 is greater than the density of the light guide structures 113b of the second group G2.

It should be noted that since the fourth group G4 and the fifth group G5 of the second single-key light guide region Z2 are farther away from the light-emitting surface 112a1 than the second group G2 of the first single-key light guide region Z1, the amount of light reaching the second group G2 is greater than the amount of light reaching the fourth group G4 and the fifth group G5. By making the fourth spacing S4 of the light guide structures 113b of the fourth group G4 and the fifth spacing S5 of the light guide structures 113b of the fifth group G5 smaller than the second spacing S2 of the light guide structures 113b of the second group G2, the amount of light reflected upward by the fourth group G4 and the fifth group G5 can be increased. In this way, the brightness of the light reflected upward by the first single-key light guide region Z1 and the second single-key light guide region Z2 can be relatively uniform and consistent.

In some embodiments, the fourth spacing S4 is substantially equal to the fifth spacing S5, but the disclosure is not limited in this regard.

As shown in FIG. 4, in the present embodiment, there is a second distance D2 between the fourth group G4 and the fifth group G5. The second distance D2 is greater than at least one of the fourth spacing S4 and the fifth spacing S5. By having the second distance D2 between the fourth group G4 and the fifth group G5, it can be ensured that a part of the light emitted by the light-emitting surface 112a1 reaches the inside of the second single-key light guide region Z2 through the interval between the fourth group G4 and the fifth group G5 without hindrance. In some embodiments, the interval between the fourth group G4 and the fifth group G5 is opposite to one side edge of the light-emitting surface 112a1 in the normal direction N1 (for example, the lower side edge of the light-emitting surface 112a1 in FIG. 4), and is deviated from another side edge of the light-emitting surface 112a1 (for example, the upper side edge of the light-emitting surface 112a1 in FIG. 4). In other words, the interval between the second group G2 and the third group G3 is opposite to the interval between the fourth group G4 and the fifth group G5 in the normal direction N1.

In some embodiments, the first distance D1 between the second group G2 and the third group G3 is substantially equal to the second distance D2 between the fourth group G4 and the fifth group G5, but the present disclosure is not limited thereto.

Figure 5:
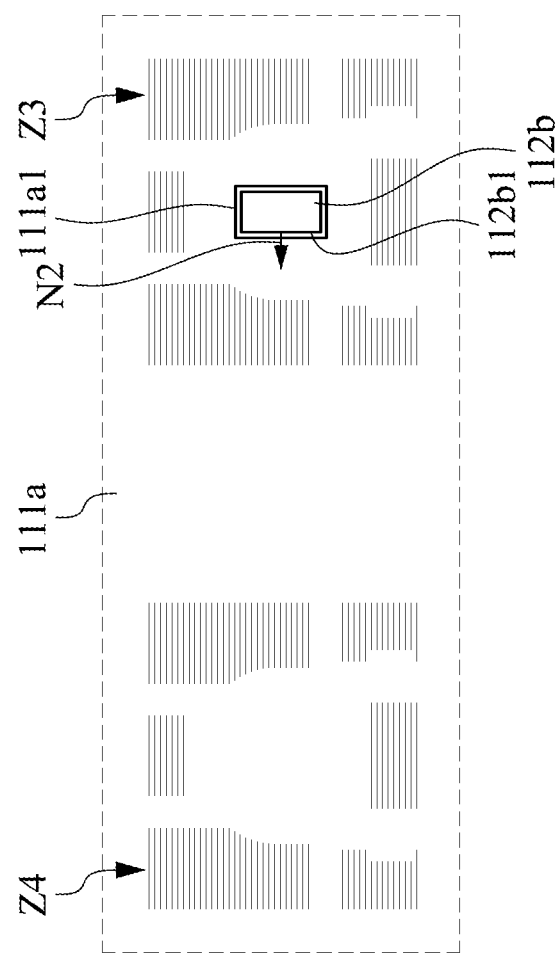
FIG. 5 is a partial enlarged view of the circuit board and the light guide plate in FIG. 2 corresponding to the region 5-5 in FIG. 3.

Reference is made to FIGS. 3 and 5. FIG. 5 is a partial enlarged view of the circuit board 111 and the light guide plate 113 in FIG. 2 corresponding to the region 5-5 in FIG. 3. As shown in FIGS. 3 and 5, in the present embodiment, the backlight module 110 further includes another light-emitting element 112b. The light-emitting element 112b is disposed on the surface 111a of the circuit board 111 and has a light-emitting surface 112b1. In some embodiments, the light-emitting surface 112b1 is substantially perpendicular to the surface 111a, but the present disclosure is not limited thereto. The normal direction N2 of the light-emitting surface 112b1 is opposite to the normal direction N1 of the light-emitting surface 112a1. The light guide plate 113 further has a third single-key light guide region Z3. The third single-key light guide region Z3 has an accommodating groove 113a2 accommodating the light-emitting element 112b. The first single-key light guide region Z1 is adjacent to the third single-key light guide region Z3 in the lateral direction LD different from the normal direction N1. In other words, the light-emitting elements 112a, 112b emit light in opposite directions, respectively.

As shown in FIGS. 4 and 5, in the present embodiment, the first single-key light guide region Z1 and the third single-key light guide region Z3 are mirrored in the normal direction N2 (or the normal direction N1). That is, the light guide structures 113b of the third single-key light guide region Z3 can be obtained by turning the light guide structures 113b of the first single-key light guide region Z1 left and right.

As shown in FIGS. 4 and 5, in the present embodiment, the light guide plate 113 further has a fourth single-key light guide region Z4 adjacent to the third single-key light guide region Z3. The light-emitting surface 112b1 of the light-emitting element 112b faces the fourth single-key light guide region Z4. The second single-key light guide region Z2 and the fourth single-key light guide region Z4 are mirrored in the normal direction N2 (or the normal direction N1). That is, the light guide structures 113b of the fourth single-key light guide region Z4 can be obtained by turning the light guide structures 113b of the second single-key light guide region Z3 left and right.

As can be seen from the above configurations, after the combination of the light-emitting element 112b, the third single-key light guide region Z3, and the fourth single-key light guide region Z4 is turned left and right, it will be substantially the same as the combination of the light-emitting element 112a, the first single-key light guide region Z1, and the second single-key light guide region Z2.

In some embodiments, the light-emitting element 112b is a side-view LED. That is, the amount of light emitted by the light-emitting surface 112b1 of the light-emitting element 112b is greater than that of the other five surfaces.

As shown in FIG. 4, in the present embodiment, the light guide plate 113 further has a fifth single-key light guide region Z5. The fifth single-key light guide region Z5 is adjacent to the second single-key light guide region Z2 in the normal direction N1. That is, the second single-key light guide region Z2 is located between the first single-key light guide region Z1 and the fifth single-key light guide region Z5, and the light-emitting surface 112a1 also faces the fifth single-key light guide region Z5. With the light guide structures 113b of the first single-key light guide region Z1 and the second single-key light guide region Z2 that extend along the normal direction N1 of the light-emitting surface 112a1, the light emitted by the light-emitting element 112a can travel from the first single-key light guide region Z1 to the third single-key light guide region Z3 via the second single-key light guide region Z2 through the gaps among the light guide structures 113b. In this way, the first single-key light guide region Z1, the second single-key light guide region Z2, and the single-key light guide region Z3 adjacent to each other can share the same light-emitting element 112a (that is, the third single-key light guide region Z3 may not have the accommodating groove 113a1), so the total number of light-emitting elements 112a, 112b used can be reduced, thereby effectively reducing the manufacturing cost of the backlight module 110 and the illuminated keyboard 100 of the present embodiment.

As shown in FIG. 4, in the present embodiment, the fifth single-key light guide region Z5 has a plurality of light guide structures 113b substantially extending along the normal direction N1. There is a sixth distance S6 between adjacent two of the light guide structures 113b of the fifth single-key light guide region Z5. The sixth spacing S6 of the second single-key light guide region Z2 is greater than the fourth spacing S4 of the fourth group G4 and the fifth spacing S5 of the fifth group G5. In other words, the density of the light guide structures 113b of the fifth single-key light guide region Z5 is greater than the density of the light guide structures 113b of the fourth group G4 and the fifth group G5. It should be noted that since the fifth single-key light guide region Z5 is farther away from the light-emitting surface 112a1 than the second single-key light guide region Z2, the amount of light reaching the second single-key light guide region Z2 is greater than the amount of light reaching the fifth single-key light guide region Z5. By making the sixth spacing S6 of the light guide structures 113b of the fifth single-key light guide region Z5 smaller than the fourth spacing S4 of the light guide structures 113b of the fourth group G4 and the fifth spacing S6 of the light guide structures 113b of the fifth group G5, the amount of light reflected upward by the fifth single-key light guide region Z5 can be increased. In this way, the brightness of the light reflected upward by the second single-key light guide region Z2 and the fifth single-key light guide region Z5 can be relatively uniform and consistent.

As shown in FIG. 3, in the present embodiment, the single-key light guide regions of the light guide plate 113 can be arranged in six rows, and the six rows are arranged sequentially in the lateral direction LD. In each row, only some single-key light guide regions are provided with the light-emitting elements 112a, 112b. For example, two or three adjacent single-key light guide regions share the same light-emitting elements 112a, 112b. In addition, the light-emitting elements 112a, 112b in adjacent two of the rows emit light in opposite directions, respectively. For example, the light-emitting element 112b emits light toward the left, and the light-emitting element 112a emits light toward the right. The light-emitting elements 112b in the first row from the top all emit light to the left, and the light-emitting elements 112a in the second row all emit light to the right, and so on. By sharing the light-emitting elements 112a, 112b in adjacent single-key light guide regions, the total number of light-emitting elements 112a, 112b can be reduced to about ⅓ of a conventional illuminated keyboard, thereby effectively reducing the manufacturing cost of the backlight module 110 and the illuminated keyboard 100 of the present disclosure. In addition, by making the light-emitting elements 112a, 112b in adjacent two of the rows emit light in opposite directions, the single-key light guide regions in the same rows as the light-emitting elements 112a can not only be illuminated by the light-emitting elements 112a, but also be secondarily illuminated by the light-emitting elements 112b in another row. Similarly, besides being illuminated by the light-emitting elements 112b, the single-key light guide regions in the same row as the light-emitting elements 112b can also be secondarily illuminated by the light-emitting elements 112a in another row.

Figure 6:
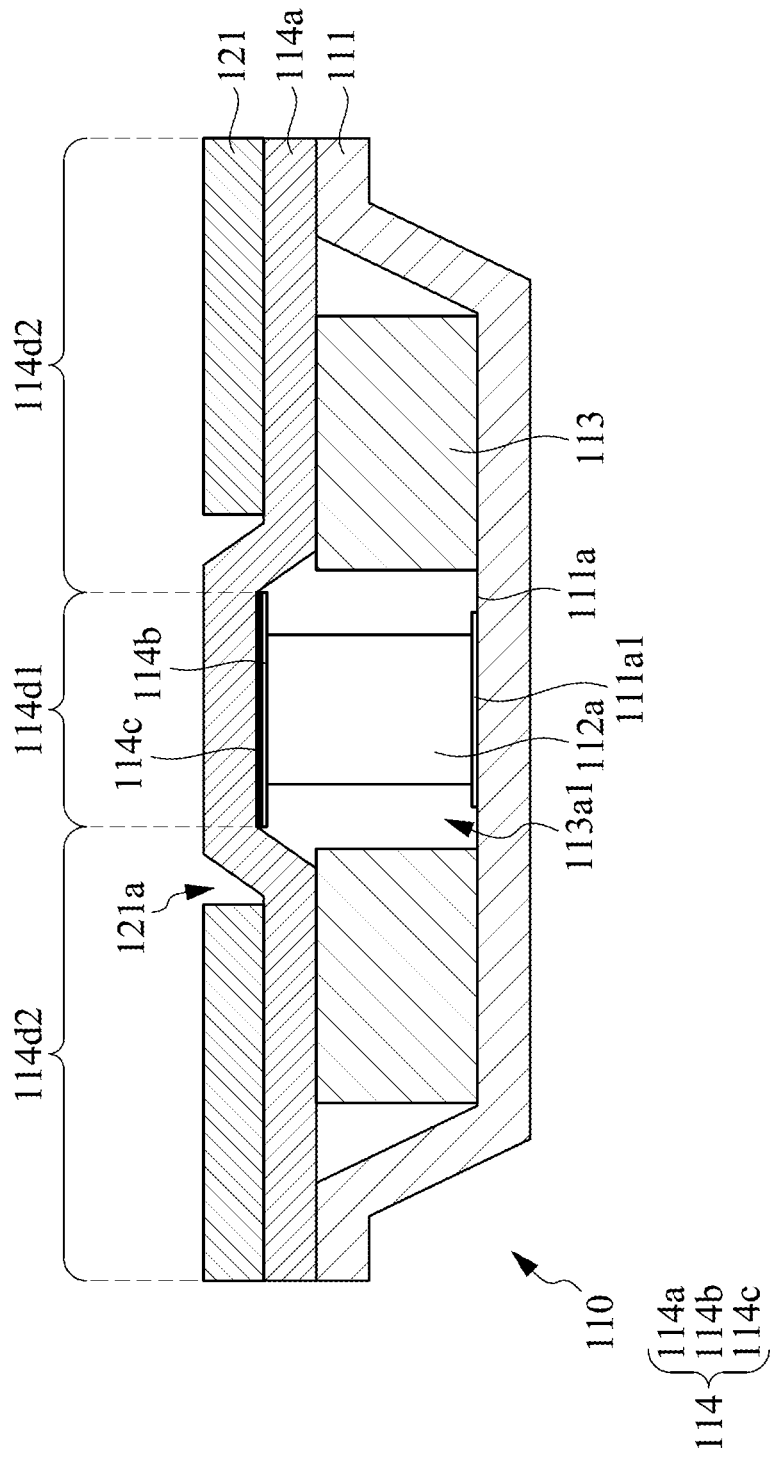
FIG. 6 is a partial cross-sectional view of the backlight module in FIG. 1 taken along line 6-6.

Reference is made to FIG. 6. FIG. 6 is a partial cross-sectional view of the backlight module 110 in FIG. 1 taken along line 6-6. As shown in FIG. 6, with reference to FIG. 4, in the present embodiment, the circuit board 111 has a white region 111a1. The light-emitting element 112a is disposed on the white region 111a1, and a bottom edge of the light-emitting surface 112a1 is completely connected to the white region 111aa. By disposing the light-emitting element 112a on the white region 111a1 of the circuit board 111 and making the bottom edge of the light-emitting surface 112a1 completely connected to the white region 111a1, the light emitted from the light-emitting surface 112a1 can be immediately reflected by the white region 111a1, thereby effectively improving the overall luminous effect of the backlight module 110 and the illuminated keyboard 100 of the present disclosure.

In some embodiments, the white region 111a1 has a glossy white paint, so as to further improve the light reflectivity.

As shown in FIG. 2, in the present embodiment, the light-shielding sheet 114 has a light-shielding region 114d1 and a plurality of light-transmitting regions. The light-transmitting regions are respectively located above the single-key light guide regions. Specifically, the first light-transmitting region 114d2 and the second light-transmitting region 114d3 are located above the first single-key light guide region Z1 and the second single-key light guide region Z2 respectively. As shown in FIGS. 2 and 6, the light-shielding region 114d1 has a portion located in the first light-transmitting region 114d2, and this portion is located above the accommodating groove 113a1. The light-shielding sheet 114 includes a base 114a, a white layer 114b, and a black layer 114c. The white layer 114b and the black layer 114c are located in the aforementioned portion of the light-shielding region 114d1 that is located in the first light-transmitting region 114d2. The black layer 114c is disposed on a side of the base 114a facing the light guide plate 113. The white layer 114b is located between the accommodating groove 113a1 and the black layer 114c. The black layer 114c is configured to shield light, so as to prevent the light from leaving the light-shielding sheet 114 from the region covered by the black layer 114c. The white layer 114b is located directly above the light-emitting element 112a to reflect the light emitted directly upward by the light-emitting element 112a downward to enter the light guide plate 113, thereby effectively improving the overall luminous effect of the backlight module 110 and the illuminated keyboard 100 of the present disclosure.

In some embodiments, the white layer 114b and the black layer 114c are ink layers, and can be formed on the base 114a through a printing process, but the disclosure is not limited thereto.

As shown in FIG. 6, in the present embodiment, the keyboard assembly 120 further has a supporting plate 121. The supporting plate 121 is disposed above the backlight module 110. The key units 122 are movably disposed on the supporting plate 121. The supporting plate 121 has a through hole 121a corresponding to the accommodating groove 113a1. In this way, the light-emitting element 112a can further protrude into the through hole 121a of the supporting plate 121, so not only can the supporting plate 121 be prevented from being damaged by the light-emitting element 112a, but also the overall thickness of the backlight module 110 and the illuminated keyboard 100 of the present disclosure can be effectively reduced.

In some embodiments, the supporting plate 121 is a metal plate, but the disclosure is not limited thereto.

According to the foregoing recitations of the embodiments of the disclosure, it can be seen that in the backlight module and the illuminated keyboard of the present disclosure, the light-emitting element is disposed in the first single-key light guide region of the light guide plate, and the light-emitting surface of the light-emitting element faces the second single-key light guide region adjacent to the first single-key light guide region. With the light guide structures of the first single-key light guide region extend along the normal direction of the light-emitting surface, the light emitted by the light-emitting element can travel from the first single-key light guide region to the second single-key light guide region through the gap among the light guide structures. In this way, the first single-key light guide region and the second single-key light guide region adjacent to each other can share the same light-emitting element, so the total number of light-emitting elements used can be reduced, and the manufacturing cost of the backlight module and the illuminated keyboard of the present disclosure can be effectively reduced. By grouping the light guide structures of the first single-key light guide region and the second single-key light guide region and adjusting the spacing of the light guide structures in each group, the light output brightness of the first single-key light guide region and the second single-key light guide region can be relatively uniform and consistent. By disposing the light-emitting element on the white region of the circuit board and making the bottom edge of the light-emitting surface be completely connected to the white region, the overall luminous effect of the backlight module and the illuminated keyboard of the present disclosure can be effectively improved. By disposing the through hole on the supporting plate of the keyboard assembly corresponding to the accommodating groove of the light guide plate for accommodating the light-emitting element, the light-emitting element can further protrude into the through hole of the supporting plate, so the overall thickness of the backlight module and the illuminated keyboard of the present disclosure can be effectively reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module, comprising:
   a circuit board;
   a first light-emitting element disposed on the circuit board and having a first light-emitting surface; and
   a light guide plate located above the circuit board and having a first single-key light guide region and a second single-key light guide region adjacent to each other, the first single-key light guide region having an accommodating groove accommodating the first light-emitting element, wherein the first light-emitting surface faces the second single-key light guiding region,
   wherein the first single-key light guide region has a plurality of light guide structures disposed corresponding to the first light-emitting surface, the light guide structures substantially extend along a first normal direction of the first light-emitting surface, the light guide structures include a first group, a second group, and a third group arranged in sequence, and the first light-emitting surface is opposite to the second group in the first normal direction,
   wherein there is a first spacing between adjacent two of the light guide structures of the first group, there is a second spacing between adjacent two of the light guide structures of the second group, there is a third spacing between adjacent two of the light guide structures of the third group, and the second spacing is greater than the first spacing and the third spacing.

2. The backlight module of claim 1, wherein the first spacing is substantially equal to the third spacing.

3. The backlight module of claim 1, wherein there is a first distance between the second group and the third group, and the first distance is greater than the second spacing.

4. The backlight module of claim 1, wherein the second single-key light guide region has a plurality of light guide structures substantially extend along the first normal direction, and the light guide structures of the second single-key light guide region are located on a side of the second single-key light guide region close to the first single-key light guide region.

5. The backlight module of claim 4, wherein the light guide structures of the second single-key light guide region are divided into a fourth group and a fifth group, there is a fourth spacing between adjacent two of the light guide structures of the fourth group, there is a fifth spacing between adjacent two of the light guide structures of the fifth group, and the second spacing is larger than the fourth spacing and the fifth spacing.

6. The backlight module of claim 5, wherein the fourth spacing is substantially equal to the fifth spacing.

7. The backlight module of claim 5, wherein there is a second distance between the fourth group and the fifth group, and the second distance is greater than at least one of the fourth spacing and the fifth spacing.

8. The backlight module of claim 5, wherein there is a first distance between the second group and the third group, there is a second distance between the fourth group and the fifth group, and the first distance is substantially equal to the second distance.

9. The backlight module of claim 1, further comprising:
   a second light-emitting element disposed on the circuit board and having a second light-emitting surface, wherein the first normal direction of the first light-emitting surface is opposite to a second normal direction of the second light-emitting surface,
   wherein the light guide plate further has a third single-key light guide region, the third single-key light guide region has another accommodating groove accommodating the second light-emitting element, and the first single-key light guide region is adjacent to the third single-key light guide region in a lateral direction different from the second normal direction.

10. The backlight module of claim 9, wherein the first single-key light guide region and the third single-key light guide region are mirrored in the second normal direction.

11. The backlight module of claim 10, wherein the light guide plate further has a fourth single-key light guide region adjacent to the third single-key light guide region, and the second single-key light guide region and the fourth single-key light guide region are mirrored in the second normal direction.

12. The backlight module of claim 1, wherein the circuit board has a white region, the first light-emitting element is disposed on the white region, and a bottom edge of the first light-emitting surface is connected to the white region.

13. The backlight module of claim 1, further comprising a light-shielding sheet, the light-shielding sheet being disposed above the light guide plate and having a light-shielding region, a first light-transmitting region, and a second light-transmitting region, the light-shielding region, the first light-transmitting region, and the second light-transmitting region being located above the accommodating groove, the first single-key light guide region, and the second single-key light guide region.

14. The backlight module of claim 13, wherein the light-shielding region includes a white layer and a black layer, and the white layer is located between the accommodating groove and the black layer.

15. An illuminated keyboard, comprising:
a backlight module comprising:
a circuit board;
a first light-emitting element disposed on the circuit board and having a first light-emitting surface; and
a light guide plate located above the circuit board and having a first single-key light guide region and a second single-key light guide region adjacent to each other, the first single-key light guide region having an accommodating groove accommodating the first light-emitting element, wherein the first light-emitting surface faces the second single-key light guiding region, wherein the first single-key light guide region has a plurality of light guide structures disposed corresponding to the first light-emitting surface, the light guide structures substantially extend along a first normal direction of the first light-emitting surface, the light guide structures include a first group, a second group, and a third group arranged in sequence, and the first light-emitting surface is opposite to the second group in the first normal direction, wherein there is a first spacing between adjacent two of the light guide structures of the first group, there is a second spacing between adjacent two of the light guide structures of the second group, there is a third spacing between adjacent two of the light guide structures of the third group, and the second spacing is greater than the first spacing and the third spacing; and
a keyboard assembly disposed above the backlight module.

16. The illuminated keyboard of claim 15, wherein the keyboard assembly has a supporting plate, and the supporting plate has a through hole corresponding to the accommodating groove.

* * * * *